United States Patent
Viegelahn

[15] 3,683,685
[45] Aug. 15, 1972

[54] APPARATUS FOR MEASURING ANGULAR ROTATION

[72] Inventor: Gary L. Viegelahn, Lake Linden, Mich.

[73] Assignee: Board of Control of Michigan Technological University, Houghton, Mich.

[22] Filed: March 27, 1970

[21] Appl. No.: 23,380

[52] U.S. Cl. ............................................. 73/136 A
[51] Int. Cl. ............................................. G01l 3/10
[58] Field of Search ............................. 73/136 A

[56] References Cited

UNITED STATES PATENTS

| | | | |
|---|---|---|---|
| 2,230,049 | 1/1941 | Klamp | 73/136 A |
| 2,260,036 | 10/1941 | Kuehni | 73/136 A |
| 2,432,900 | 12/1947 | Jacobsen | 73/136 A |
| 2,737,049 | 3/1956 | Waugh | 73/136 A |
| 3,084,540 | 4/1963 | Larkin | 73/136 A |
| 3,339,405 | 9/1967 | McDowall | 73/136 A |
| 3,104,544 | 9/1963 | Guiot | 73/136 A |
| 3,403,550 | 10/1968 | Hawkins | 73/136 A |

FOREIGN PATENTS OR APPLICATIONS

| | | | |
|---|---|---|---|
| 158,684 | 3/1964 | U.S.S.R. | 73/88.5 |

Primary Examiner—Richard C. Queisser
Assistant Examiner—Herbert Goldstein
Attorney—John W. Michael, Gerrit D. Foster, Bayard H. Michael, Paul R. Puerner, Joseph A. Gemignani, Andrew O. Riteris, Daniel Van Dyke and Spencer B. Michael

[57] ABSTRACT

Relative angular rotation between two spaced areas on a rotatable member is converted to linear motion by providing a threaded engagement between two tubes each of which is connected to a respective one of said areas for rotational movement therewith. Relative rotation between the spaced areas causes relative rotation between the tubes and this is converted by the threaded engagement into axial or linear movement. This linear movement can then be converted into an electrical signal which can be registered or recorded by an electronic device. To increase the range of angular rotation which can be effectively measured, a third member is interposed between those already discussed. A threaded connection is provided between this third member and one of the first mentioned members and a pin and slot connection is provided between the third member and the other of the two first mentioned members. The pin and slot connection accommodates linear movement so that axial movement of the connections of the tubes at the spaced areas does not occur.

10 Claims, 5 Drawing Figures

PATENTED AUG 15 1972  3,683,685
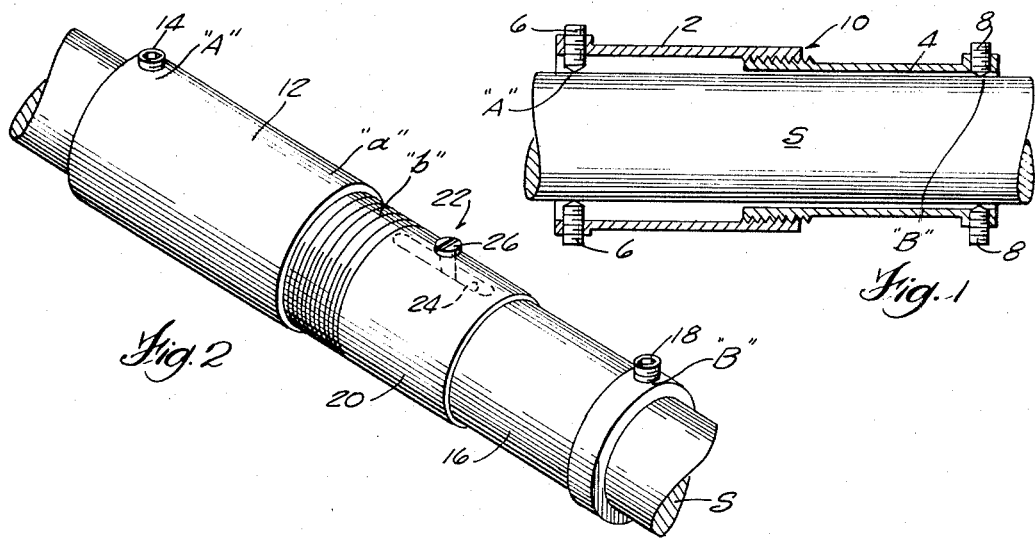
Fig. 1
Fig. 2
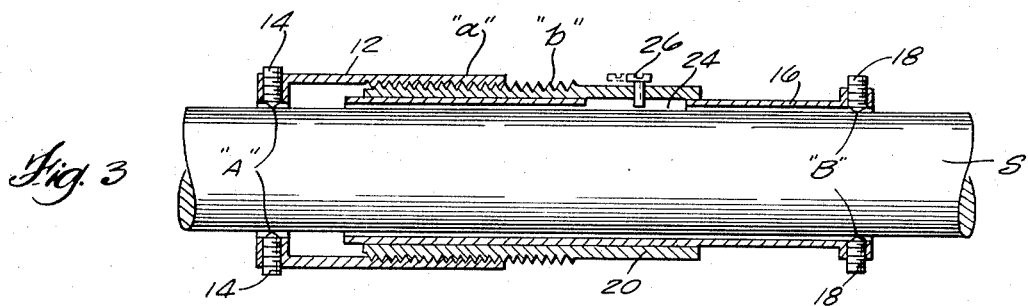
Fig. 3
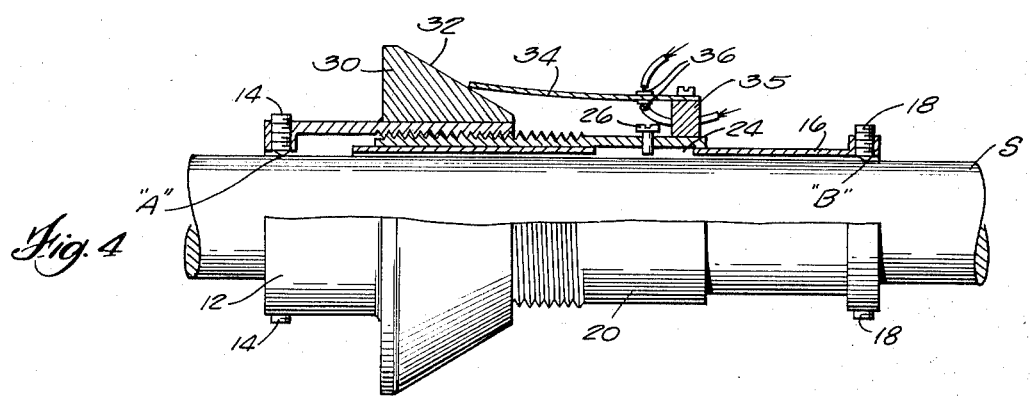
Fig. 4
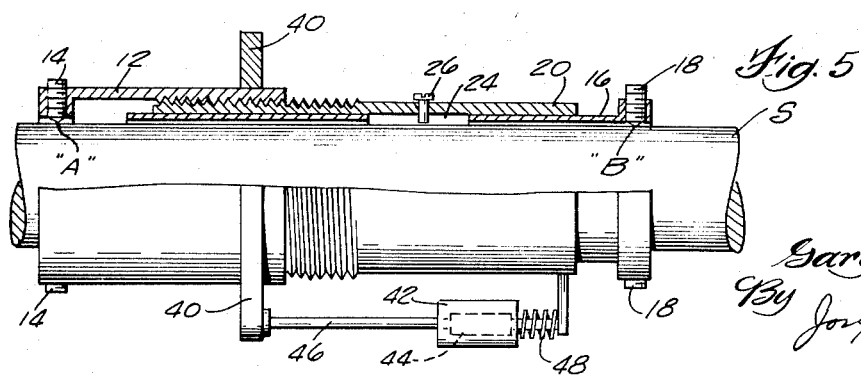
Fig. 5
Inventor
Gary L. Viegelahn
By Joseph A. Geniesse
Attorney

APPARATUS FOR MEASURING ANGULAR ROTATION

This invention relates to arrangements for measuring angular rotation and, more particularly, to such an arrangement as can measure both torque in a rotatable member and relatively large amounts of angular rotation.

Various arrangements have been proposed in the past but these have generally not been completely satisfactory. A number of prior proposals have been acceptable only for measuring small angles of rotation because, for example, they have been limited to use within the elastic limit of the material in the member which is measuring the torsion. Other proposals have required visual inspection which, for some applications, may not be satisfactory. In addition, these prior arrangements tend to be rather complex and designed for use with a specific application in mind, and therefore lack flexibility in application.

SUMMARY OF INVENTION

Among the general objects of this invention is to provide a simple and economical device which will measure angular rotation in a member or between two reference points whether the angle is small or relatively large and, moreover, one which permits use in connection with an arrangement capable of providing a suitable read-out.

For the achievement of these and other objects, this invention proposes to connect two sensing members relative to a rotatable member such that rotation of that member is translated into relative movement between the two sensing members which, depending upon the particular application, can be used as an indication of torque in the rotatable member or the amount of rotation of that member. The two sensing members can be connected one with respect to the other and with respect to the rotatable member such that torsion in or rotation of that member causes relative rotation and axial displacement between the sensing members which corresponds to the degree of torsion or amount of rotation. In this connection the two sensing members can be threaded together to provide for relative rotation therebetween and consequential axial movement, or a third member may be interposed between the sensing members. The third member can be threaded to one of the sensing members and have a connection with the other, e.g. a pin and slot connection, by means of which the sensing members rotate relative to each other and axial movement is accommodated in the pin and slot connection. The later affords the advantage of increasing the amount of relative rotation which can be measured without any axial movement at the areas at which the sensing members are connected with respect to the rotatable member. Both arrangements translate rotation into linear movement which can be used in providing a suitable read-out.

FIG. 1 is an axial section view of an embodiment of an arrangement which converts angular rotation into linear motion;

FIG. 2 is a perspective view of an alternative embodiment;

FIG. 3 is an axial section view of the device shown in FIG. 2;

FIG. 4 is a sectional view of another embodiment of the proposed invention; and

FIG. 5 is a sectional view of still another alternative embodiment of the proposed invention.

With reference to FIG. 1, an arrangement of cylindrical tubes 2 and 4 is connected to shaft S. The shaft is mounted for rotation and each tube is connected to the shaft for rotation therewith, but connected at axially spaced areas on the shaft. More specifically, tube 2 is connected to shaft S at area "A" by set screws 6. Tube 4 is connected to shaft S by set screws 8, but screws 8 engage the shaft at an area "B" which is spaced axially from area "A". Tubes 2 and 4 are joined through a threaded connection 10.

With this arrangement, tubes 2 and 4 will rotate with shaft S but serve to sense and respond to relative angular movement between shaft areas "A" and "B". By reason of threaded connection 10, such angular movement causes the tubes to rotate relative to each other and also results in axial movement therebetween. This axial movement is thus a measure of relative movement between areas "A" and "B" or, stated another way, torque in the shaft.

The arrangement of FIG. 1, although adequate for many applications, has a shortcoming in that it is limited to measuring relatively small amounts of angular movement. Large amounts of angular movement may result in axial movement to such a degree as to move the tube connection at either area "A" or "B", or both. Disturbing the connection can adversely affect the reliability of future response to angular movement or torque.

The arrangement in FIG. 2, while incorporating the features of the embodiment of FIG. 1, overcomes the aforementioned shortcoming and can be used to measure relatively larger amounts of angular movement.

In order to convert the angular rotation between reference areas "A" and "B" to linear movement, the embodiment of FIG. 2 includes three cylindrical tubes mounted on shaft S. An outer tube 12 is secured to shaft S at reference area "A" by suitable means such as set screws 14 threaded through tube 12 to engage the shaft at area "A". An inner tube 16 is likewise suitably fixed to shaft S at area "B" by set screws 18. An intermediate tube 20 is provided between and telescopes both tubes 12 and 16. Tube 20 is in threaded engagement with tube 12 and thus is free to rotate relative to tube 12 and to move axially with respect to tube 12 as a result of that rotation.

Means 22 is provided and prevents tube 20 from rotating relative to tube 16 while at the same time permitting axial movement between tubes 20 and 16. Means 22 is comprised of an axial slot 24 in tube 16 and a pin 26 secured to tube 20 and projecting into slot 24 but not engaging shaft S. For accuracy in measurement, the width of slot 24 is close to the diameter of pin 26 to reduce to a minimum, if not completely eliminate, any lost motion between tubes 20 and 16. On the other hand, axial movement between tubes 16 and 20 is accommodated by slot 24.

Linear motion is achieved as follows, upon twisting of shaft S, relative rotation occurs between reference areas "A" and "B". This will cause relative rotation between tube 12 and tubes 16 and 20 considered as a unit. This occurs because tube 16 is secured to shaft S at reference area "B", tube 16 being operatively linked to tube 20 through pin and slot connection 22. As this relative rotation occurs, tube 20 will be threaded into or out of tube 12 causing axial movement therebetween. Only tube 20 moves axially relative to shaft S. That is, since tube 12 is secured to shaft 10, any rotation between tubes 12 and tube 20 will cause tube 20 to move axially relative to tube 12. This is permitted without requiring any resultant axial movement of tube 16 because of the pin and slot connection. Therefore, at all times the connections at reference areas "A" and "B" remain true with no axial movement therebetween yet there is axial or linear movement relative to the points which can be measured. By picking a set of reference points on tubes 12 and 20, for example points $a$ and $b$ shown in the drawings (or similar points on tubes 16 and 20), this resultant linear displacement can be used as a measure of rotation between areas "A" and "B".

Two arrangements for converting linear motion between reference points $a$ and $b$ to a useable signal are shown in the drawings. The first alternative, shown in FIG. 4, utilizes a truncated cone 30 mounted on the outer periphery of tube 12, with the sloping cone surface 32 facing axially towards tube 20. A cantilever beam 34 extends axially with respect to tubes 12 and 30 and is fixed to tube 20 through mounting block 35. A pair of strain gauges 36 are mounted on the upper and lower surface of beam 34, the strain gauges being appropriately wired in an electrical read-out circuit (not shown). A base position is selected wherein the strain gauges are prestressed and provide a base or reference reading or condition of the read-out circuit. Upon axial movement of tube 20, beam 34 will be deflected up or down on cone 30. The resultant change in resistance of the strain gauges thus provides an electrical signal, or deviation from the base or reference reading, corresponding to the axial displacement which is in turn a direct function of the angular rotation between reference areas "A" and "B". The electrical signal so provided can then be fed into an appropriate electronic device for recording and/or providing a direct read-out.

An alternative arrangement for obtaining an electric signal is shown in FIG. 5. In this arrangement an annular flange 40 is connected at some convenient point on tube 12. One possible mode of connection is to tack weld the flange around tube 12. A linear variable differential transformer includes coil 42 and core 44. Coil 42 is affixed to tube 20. A push rod 46 extends from core 44 to engage flange 40 and a spring 48. Spring 48 maintains engagement of push rod 46 with flange 40 so that the push rod, and correspondingly core 44, move jointly with tube 20. Again, a neutral position is selected wherein core 44 assumes a preselected position within coil 42 to establish a base or reference condition of an electric circuit (now shown) of which the coil and core are a part. Axial movement of tube 20 with respect to tube 12 will cause push rod 46 to move an equal distance thereby causing core 44 to likewise move in coil 42 and change the output signal of the coil in proportion to the linear movement of the tube. This results in an electric signal corresponding to the linear movement, which signal is directly proportional to the angular rotation between points "A" and "B". Again, this signal may be fed into an appropriate device for recording or translation into a direct read-out.

It will be appreciated that the arrangement provided by this invention can measure relatively small and large amounts of angular rotation or torque. Thus, within practical limits, the degree of rotation between the reference points does not place any limitation on the device. Sepcifically, the described arrangement can be used to measure relatively small amounts of torque and also can be used to measure angular rotation in multiples of 360° without affecting accuracy or operation. Further flexibility in use of the device is present in the embodiments of FIG. 2—5 in that the distance between reference areas can be selected by moving the tubes 12 and 16 axially. The length of slot 24 can be varied as desired and thus affords wide latitude in the amount of torque, or rotation, that can be measured.

Although the invention has been illustrated and described in connection with preferred embodiments thereof, it will be apparent to those skilled in the art that various changes and modifications may be made therein without departing from the spirit of the invention or from the scope of the appended claims.

I claim

1. Apparatus for measuring angular rotation between two axially spaced areas on a rotatable body comprising, in combination, first means affixed to said rotatable body at one of said areas and having an axial extension along said rotatable body, second means affixed to said rotatable body at the other of said areas and having an axial extension along said rotatable body, third means connecting said first and second means and operative to respond to relative rotation between said first and second means as a result of relative angular rotation between said areas and to move axially relative to said first and second means by an amount corresponding to said relative rotation between said spaced areas, and motion sensing means including fourth means connected to one of said first and second means, and fifth means connected to said third means and adapted to move axially therewith whereby said fourth and fifth means move axially relative to one another in response to said angular rotation and said relative axial movement to generate a signal representative of the degree of said angular rotation.

2. The apparatus of claim 1 wherein said first and second means comprise generally tubular members and said third means comprises a threaded connection between said tubular members.

3. The apparatus according to claim 1 wherein said third means is connected to said second means through means holding said third means against rotation relative to said second means and providing for relative axial movement therebetween so that said angular rotation results in rotation of said third means relative to said first means and axial displacement of said third means relative to both said first and second means.

4. The apparatus according to claim 1 wherein said first means comprises a first cylindrical tube surrounding a portion of said rotatable body, including means for attaching said first tube to one of said areas and with a portion extending toward said other area, wherein said second means comprises a second cylindrical tube surrounding a portion of said rotatable body, including means for attaching said second tube to said other of said areas and with a portion extending toward said one area, and wherein said third means includes a third cylindrical tube surrounding said rotatable body and being in threaded engagement with said first tube to permit relative rotation and axial displacement therebetween, said third tube being in telescoped relationship with said second tube, and including means connecting said second and third tubes and operative to permit axial displacement while preventing relative rotation therebetween.

5. The apparatus according to claim 4 wherein said motion sensing means comprises a cone mounted on the outer periphery of one of said three cylindrical means with the angularly sloping surface thereof facing in a generally axial direction, a beam mounted on another of said three cylindrical means, said beam extending axially toward and engaging said sloped surface of said cone so that axial movement of said cone or beam towards or away from each other will deflect said beam, and at least one strain gauge mounted on said beam so that the deflection of said beam will produce a signal corresponding to the rotation between said areas.

6. The apparatus according to claim 4 wherein said motion sensing means comprises an electrical coil affixed to one of said three cylindrical means, a core extending into said coil, means connecting said core to another of said three cylindrical means so that axial movement of said one of said three cylindrical means relative to said other will cause said core to move axially relative to said coil and change the output signal of the coil in accordance with the angle of rotation between said areas.

7. The apparatus according to claim 4 wherein said last mentioned means comprises means defining an axial slot in one of said second and third tubes and a pin fixed to the other of said second and third tubes, said pin and slot permitting said third tube and second tubes to move axially with respect to each other while preventing relative rotation therebetween.

8. The apparatus according to claim 7 wherein said motion sensing means comprises a cone having a sloping surface facing in a generally axial direction and a beam, one of said cone and beam mounted on said third tube and the other mounted on one of said first and second tubes, said beam extending axially toward and engaging the sloped surface of said cone so that axial movement of said cone or beam toward or away from each other will deflect said beam, and at least one strain gauge mounted on said beam so that the deflection of said beam will produce a signal proportional to the angle of rotation between said areas.

9. The apparatus according to claim 7 wherein said motion sensing means comprises an electrical coil and core, said coil connected to said third tube, said core connected to one of said first and second tubes and extending into said coil so that axial movement of said third cylindrical tube relative to said one of said first and second tubes will cause said core to move relative to said coil to generate a signal corresponding to the angle of rotation between said areas.

10. Apparatus for measuring angular rotation between two axially spaced areas on a rotatable body comprising, in combination, first and second members threadably connected together to provide relative axial movement therebetween in response to relative rotation thereof, means affixing said first member to one of said areas;

means connecting said second member to the other of said areas, said connecting means connected to and rotatable with said rotatable body and operative to permit said second member to rotate with said rotatable body while accommodating relative axial movement between said first and second members; and motion sensing means including a first sensing member affixed to one of said first and second members and a second sensing member affixed to the other of said first and second members and adapted to move axially, therewith whereby said first and second sensing members move axially relative to one another in response to said angular rotation and said relative axial movement to generate a signal representative of the degree of said angular rotation.

* * * * *